United States Patent
van Tooren et al.

(10) Patent No.: US 10,814,607 B2
(45) Date of Patent: Oct. 27, 2020

(54) INTEGRATED ROBOTIC 3D PRINTING SYSTEM FOR PRINTING OF FIBER REINFORCED PARTS

(71) Applicants: University of South Carolina, Columbia, SC (US); Tighitco, Inc., North Charleston, SC (US)

(72) Inventors: Michael Johannes Leonardus van Tooren, Columbia, SC (US); Zafer Gurdal, Columbia, SC (US); Joshua Tarbutton, Columbia, SC (US); Ramy Harik, Columbia, SC (US)

(73) Assignees: University of South Carolina, Columbia, SC (US); Tighitco, Inc., North Charleston, SC (US)

( * ) Notice: Subject to any disclaimer, the term of this patent is extended or adjusted under 35 U.S.C. 154(b) by 270 days.

(21) Appl. No.: 15/246,781

(22) Filed: Aug. 25, 2016

(65) Prior Publication Data

US 2017/0057167 A1  Mar. 2, 2017

Related U.S. Application Data

(60) Provisional application No. 62/209,573, filed on Aug. 25, 2015.

(51) Int. Cl.
*B29C 64/118* (2017.01)
*B29C 64/245* (2017.01)
(Continued)

(52) U.S. Cl.
CPC ............ *B33Y 50/02* (2014.12); *B29C 64/106* (2017.08); *B29C 64/245* (2017.08);
(Continued)

(58) Field of Classification Search
None
See application file for complete search history.

(56) References Cited

U.S. PATENT DOCUMENTS

| 4,898,527 A | 2/1990 | Claassen et al. |
| 6,113,696 A | 9/2000 | Tseng et al. |
(Continued)

FOREIGN PATENT DOCUMENTS

| CN | 204431743 | 7/2015 |
| DE | 10049473 | 5/2001 |
(Continued)

OTHER PUBLICATIONS

English translation of WO 2015/073322 (Year: 2015).*
(Continued)

*Primary Examiner* — Jacob T Minskey
*Assistant Examiner* — Baileigh Kate Darnell
(74) *Attorney, Agent, or Firm* — Dority & Manning, P.A.

(57) ABSTRACT

A system for printing a three-dimensional object is provided. The system can include at least one print head configured to receive a continuous fiber and at least partially encase the continuous fiber with a formation material to create a composite material. The at least one print bed can be configured to move in at least six different degrees of freedom. The system can also include at least one print bed comprising a printing surface onto which the composite material may be selectively applied to form a work piece. The at least one print head can be positioned relative to the at least one print bed and configured to advance print media thereon.

10 Claims, 4 Drawing Sheets

(51) Int. Cl.
| | |
|---|---|
| *B33Y 30/00* | (2015.01) |
| *B33Y 50/02* | (2015.01) |
| *B29C 64/106* | (2017.01) |
| *B33Y 70/00* | (2020.01) |
| *B33Y 10/00* | (2015.01) |
| *B29C 70/38* | (2006.01) |
| *B29K 279/00* | (2006.01) |
| *B29K 307/04* | (2006.01) |

(52) U.S. Cl.
CPC ............ *B29C 70/382* (2013.01); *B33Y 10/00* (2014.12); *B33Y 30/00* (2014.12); *B33Y 70/00* (2014.12); *B29K 2279/085* (2013.01); *B29K 2307/04* (2013.01)

(56) References Cited

U.S. PATENT DOCUMENTS

| | | | |
|---|---|---|---|
| 6,907,307 B2 | 6/2005 | Chen et al. | |
| 6,942,830 B2 | 9/2005 | Mülhaupt et al. | |
| 7,122,246 B2 | 10/2006 | Comb et al. | |
| 8,226,395 B2* | 7/2012 | Pax | B29C 64/106 425/174.4 |
| 8,778,252 B2* | 7/2014 | Mackie | B29C 64/106 264/308 |
| 9,211,674 B2 | 12/2015 | Van Tooren et al. | |
| 9,527,272 B2* | 12/2016 | Steele | B33Y 10/00 |
| 9,539,762 B2* | 1/2017 | Durand | B29C 67/0051 |
| 9,745,452 B2 | 8/2017 | Hwang et al. | |
| 2008/0042321 A1* | 2/2008 | Russell | B41J 2/16532 264/308 |
| 2009/0014919 A1 | 1/2009 | Rossfeldt et al. | |
| 2009/0273122 A1 | 11/2009 | Batchelder et al. | |
| 2010/0237531 A1* | 9/2010 | Lyons | B22F 1/0074 264/132 |
| 2010/0291304 A1 | 11/2010 | Becker | |
| 2014/0023812 A1 | 1/2014 | Hammer et al. | |
| 2014/0291886 A1 | 10/2014 | Mark et al. | |
| 2014/0328963 A1 | 11/2014 | Thomas et al. | |
| 2014/0328964 A1* | 11/2014 | Mark | B29C 67/0088 425/166 |
| 2015/0108677 A1* | 4/2015 | Mark | B29C 70/20 264/138 |
| 2015/0210007 A1* | 7/2015 | Durand | B29C 67/0051 264/401 |
| 2015/0251360 A1* | 9/2015 | Steele | B33Y 10/00 264/308 |
| 2015/0290875 A1* | 10/2015 | Mark | B29C 70/20 264/138 |
| 2015/0314531 A1* | 11/2015 | Mark | B33Y 70/00 264/241 |
| 2015/0375457 A1* | 12/2015 | Mark | B29C 67/0088 425/166 |
| 2016/0009030 A1* | 1/2016 | Mark | B29C 67/0085 264/308 |
| 2016/0046082 A1* | 2/2016 | Fuerstenberg | B33Y 30/00 264/480 |
| 2016/0177078 A1 | 6/2016 | Naito et al. | |
| 2017/0028639 A1* | 2/2017 | Evans | B29C 70/38 |
| 2017/0028644 A1* | 2/2017 | Evans | B29B 15/122 |
| 2017/0044337 A1 | 2/2017 | Van Tooren et al. | |
| 2017/0106565 A1 | 4/2017 | Braley et al. | |
| 2017/0136707 A1 | 5/2017 | Batchelder et al. | |
| 2017/0355142 A1 | 12/2017 | Sterman et al. | |
| 2018/0063895 A1 | 3/2018 | Van Tooren et al. | |
| 2018/0356118 A1 | 12/2018 | Van Tooren et al. | |

FOREIGN PATENT DOCUMENTS

| | | |
|---|---|---|
| JP | S 56161259 | 12/1981 |
| KR | 2018/0040555 | 4/2018 |
| KR | 2018/0055425 | 5/2018 |
| WO | WO 2015/077262 | 5/2015 |
| WO | WO 2015/112998 | 7/2015 |

OTHER PUBLICATIONS

Assouli; et al. "Detection and identification of concrete cracking during corrosion of reinforced concrete by acoustic emission coupled to the electrochemical techniques,"*NDT&E International*, 2005 38(8), pp. 682-689.

ASTM C 1260-07; "Potential Alkali Reactivity of Aggregate (Mortar-Bar Method)," American Society for Testing Materials, Philadelphia, 2007; 652-655; (5 pages).

ASTM C114-13; "Standard Test Methods for Chemical Analysis of Hydraulic Cement," *American Society for Testing and Materials*, 2013; 1-16; (3pages—abstract only).

ASTM C1293; "Stardard Test Method for Determination of Length Change of Concrete Due to Alkali-Silica Reaction," *American Standard for Testing and Materials*, 2008; 1-7; (2 pages—abstract only).

ASTM C138 / C138M-13a; "Standard Test Method for Density (Unit Weight), Yield, and Air Content (Gravimetric) of Concrete," *American Society for Testing and Materials*, 2013; 1-9; (2 pages—abstract only).

ASTM C157 / C157M-08; "Standard Test Method for Length Change of Hardened Hydraulic-Cement Mortar and Concrete," *American Society for Testing and Materials*, 2008; 1-5; (3 pages-abstract only).

ASTM C192 / C192M-13a; "Standard Practice for Making and Curing Concrete Test Specimens in the Laboratory" *American Society for Testing and Materials*, 2013; 7-20; (2 pages-abstract only).

ASTM C231 / C231M-10; "Standard Test Method for Air Content of Freshly Mixed Concrete by the Pressure Method," *American Society for Testing and Materials*, 2010; (10 pages).

ASTM C29 / C29M-09; "Standard Test Method for Bulk Density ("Unit Weight") and Voids in Aggregate," *American Society for Testing and Materials*, 2009; 1-13; (2 pages-abstract only).

ASTM E1316. 2006; "Standard Terminology for Nondestructive Examinations," *American 161 Society for Testing and Materials*, 1-33 (2 pages-abstract only).

Elbatanouny, el al; "Identification of Cracking Mechanisms in Scaled FRP Reinforced Concrete Beams using Acoustic Emission," *Experimental Mechanics*, DOI 10.1007/s11340-012-9692-3, Nov. 17 (online) 2012; 15 pages.

Elbatanouny, et al; "Acoustic-Emission-Based Characterization of Corrosion Damage in Cracked Concrete with Prestressing Strand," *ACI Materials Journal*, 2013; 110 (1), pp. 89-98.

Elbatanouny, et al; "Corrosion Intensity Classification in Pre-stressed Concrete using Acoustic Emission Technique," *Proc. American Society for Nondestructive Testing (ASNT) Fall Conference and Quality Testing Show* 2011, Palm Springs, CA. Oct. 24-28, (9 pages).

Fowler, et al; "Now Directions in Testing," *Proc. 3rd International Symposium on AE from Composite Materials*, Paris, France. 1989 (1 pages-abstract only).

Idrissi, et al; "Study and characterization by acoustic emission and electrochemical measurements of concrete deterioration caused by reinforcement steel corrosion," *NDT&E International*, 2003; 36(8), pp. 563-569.

Pollock, A.A; "Classical Wave Theory in Practical AE Testing. Progress in AE III," *Proceedings of the 8th International AE Symposium, Japanese Society for Nondestructive Testing*, (1986) pp. 708-721.

Swamy; "The Alkali-Silica Reaction in Concrete. New York," *Blackie and Son Ltd*; 1998; (348 pages).

Ziehl; "Applications of Acoustic Emission Evaluation for Civil Infrastructure," *SPIE Proc. SPIE Smart Structures NDE*, San Diego, CA, 2008 (9 pages).

University of South Carolina; International Patent Application No. PCT/US2016/048570; International Search Report dated Nov. 14, 2016; (2 pages).

EPO Partial Supplementary European Search Report, dated Apr. 18, 2019. (Appl. No. 16840090.1).

(56) References Cited

OTHER PUBLICATIONS

Achillas, et al. "A methodological framework for the inclusion of modern additive manufacturing into the production portfolio of a focused factory" *J. Manufact. Syst.* 37 (2015) pp. 328-339.
Agassant, et al. "Polymer processing extrusion instabilities and methods for their elimination or minimization" *Int'l Polym. Proc.* 21(3) (2006) pp. 239-255.
Ageorges, et al. "Fusion Bonding of Polymer Composites, Engineering Materials and Processes" (2002). ISBN 1-85233-429-0. (Abstract only).
Ahn, et al. "Anisotropic material properties of fused deposition modeling ABS" *Rapid Prototyp. J.* 8(4) (2002) pp. 248-257.
Alexander, et al. "Part orientation and build cost determination in layered manufacturing" *Comp.-Aided Des.* 30(5) (1998) pp. 343-356.
American Machinist. "The CAD/CAM hall of fame" http://americanmachinist.com/cadcam-software/cadcam-hall-fame (1998) pp. 1-3.
Arevo Labs. "Robotic Additive Manufacturing Platform—RAMP" http://www.arevolabs.com (2015).
Bellini, et al. "Mechanical characterization of parts fabricated using fused deposition modeling" *Rapid/Prototyp. J.* 9 (2003) pp. 252-264.
Byun, et al. "Determination of the optimal build direction for different rapid prototyping processes using multi-criterion decision making" *Robot. Comp.-Integr. Manufac.* 22(1) (2006) pp. 69-80.
Canellidis, et al. "Efficient parts nesting schemes for improving stereolithography utilization" *Comp.-Aided Des.* 45(5) (2013) pp. 875-886.
Chacón, et al. "Integration of topology optimized designs into CAD/CAM via an IGES translator" *Struct. Multidisc. Optim.* 50(6) (2014) pp. 1115-1125.
Chakraborty, et al. "Extruder path generation for curved layer fused deposition modeling" *Comp.-Aided Des.* 40 (2008) pp. 235-243.
Cheng, et al. "Multi-objective optimization of part-building orientation in stereolithography" *Rapid Prototyp. J.* 1(4) (1995) pp. 12-23. (Abstract only).
Choi, et al. "A versatile virtual prototyping system for rapid product development" *Comp. Indus.* 59 (2008) pp. 477-488.
Choi, et al. "A multi-material virtual prototyping system" *Comp.-Aided Des.* 37 (2004) pp. 123-136.
Choi, et al. "A virtual prototyping system for rapid product development" *Comp.-Aided Des.* 36 (2003) pp. 401-412.
Choset, et al. "Principles of robot motion: theory, algorithms, and implementation" *MIT Press* (2005).
Conner, et al. "Making sense of 3d printing: Creating a map of additive manufacturing products and services" *Add. Manufact.* 1(4) (2014) pp. 64-76.
Cupar, et al. "Shape verification of fused deposition modelling 3D prints" *Int 'l J. Info. Comp. Sci.* 4 (2015) pp. 1-8.
Ding, et al. "A practical path planning methodology for wire and arc additive manufacturing of thin-walled structures" *Robot Comp.-Integr. Manufact.* 34 (2015) pp. 8-19.
Doherty, et al. "Selective directional reinforcement of structures for multi-axis additive manufacturing" *CAMX Conf. Proc.* (2016) pp. 1-14.
Dolenc, et al. "Slicing procedure for layered manufacturing techniques" *Comp.-Aided Des.* 26 (1994) pp. 119-126.
Donald, et al. "Kinodynamic motion planning" *J. Assoc. Comp. Mach.* 40(5) (1993) pp. 1048-1066.
El-Gizawy, et al. "Process-induced properties of FDM products" *Proc. ICMET* (2011) pp. 25-29.
Fitter, et al. "A review on approaches for handling Bézier curves in CAD for manufacturing" *Procedia Eng.* 97 (2014) pp. 1155-1166.
Frank, et al. "Expert system-based selection of the preferred direction of build for rapid prototyping processes" *J. Intell. Manufact.* 6(5) (1995) pp. 339-345. (Preview Abstract only).
Gao, et al. "The status, challenges, and future of additive manufacturing in engineering" *Comp.-Aided Des.* 69 (2015) pp. 65-89.
Gardner, et al. "High temperature thermoplastic additive manufacturing using low-cost, open-source hardware" *NASA Langley Research Center* NASA/TM-2016-219344 (2016) pp. 1-15.
Grutle, Ø.K. "5-axis 3D Printer" *U. Oslo* (2015) pp. 1-114.
Guo, B. "Surface reconstruction: From points to splines" *Comp.-Aided Des.* 9(4) (1997) pp. 269-277. (Abstract only).
Hart, et al. "A formal basis for the heuristic determination of minimum cost paths" *IEEE Trans. Sys. Sci. Cyber.* 4(2) (1968) pp. 100-107. (Abstract only).
Huang, et al. "Evolutionary Topology Optimization for Continuum Structures: Methods and Applications" *John Wiley & Sons, Ltd.* (2010) pp. 121-150.
Invernizzi, et al. "UV-assisted 3D printing of glass and carbon fiber-reinforced dual-cure polymer composites" *Materials* 9(7):583 (2016) pp. 1-12.
Jamieson, et al. "Direct slicing of CAD models for rapid prototyping" *Rapid Prototyp. J.* 1 (1995) pp. 4-12. (Abstract only).
Kavraki, et al. "Probabilistic roadmaps for path planning in high-dimensional configuration spaces" *IEEE Trans. Robot. Autom.* 12(4) (1996) pp. 566-580.
Kerbrat, et al. "Manufacturability analysis to combine additive and subtractive processes" *Rapid Prototyp. J.* 16(1) (2010) pp. 63-72.
Kim, et al. "Tool path generation for clean-up machining by a curve-based approach" *Comp.-Aided Des.* 37(9) (2005) pp. 967-973.
Koc, et al. "Adaptive ruled layers approximation of STL models and multi-axis machining applications of rapid prototyping" *J. Manuf. Sys.* 21 (2003) pp. 153-166.
Kruth, et al. "Progress in additive manufacturing and rapid prototyping" *Annuals of CIRP* 47(2) (1998) pp. 525-540.
KUKA AG. "Roboter GmbH Controller: KR AGILUS six with W and C Variants Specification" *KUKA Robotics Corporation* (2015) pp. 1-133.
KUKA AG. "Roboter GmbH Controller: KR C4 Operating Instructions" *KUKA Robotics Corporation* (2012) pp. 1-183.
KUKA AG. "Kuka.Sim" *KM Robotics Corporation* Ver. 2.2 (2016).
KUKA AG. "Kuka.WorkVisual." *KUKA Robotics Corporation* Ver. 3.2-4.1 (2014).
Kulkarni, et al. "A review of process planning techniques in layered manufacturing" *Rapid Prototyp. J.* 6(1) (2000) pp. 18-35.
Kulkarni, et al. "Deposition strategies and resulting part stiffnesses in fused deposition modeling" *J. Manuf. Sci. Eng.* 121(1) (1999) pp. 93-103.
Kulkarni, et al. "An accurate slicing procedure for layered manufacturing" *Comp.-Aided Des.* 28 (1996) pp. 683-697.
Kumar, et al. "Representation and processing of heterogeneous objects for solid freeform fabrication" *Geom. Model. Worksh.* WG5.2 (1998) pp. 1-21.
Local Motors. "Local Motors Strati 3D Printed Car" *Int 'l Manufact. Techn. Show* (2014).
Ma, et al. "NURBS-based adaptive slicing for efficient rapid prototyping" *Comp.-Aided Des.* 36 (2004) pp. 1309-1325.
Maker's Tool Works. "MendelMax 3" *Maker 's Tool Works, LLC* (2015).
Martínez, et al. "Comparative between FEM models for FDM parts and their approach to a real mechanical behavior" *Procedia Eng.* 63 (2013) pp. 878-884.
Masood, et al. "A generic algorithm for a best part orientation system for complex parts in rapid prototyping" *J. Mater. Proc. Techn.* 139(1) (2003) pp. 110-116.
Matsuzaki, et al. "Three-dimensional printing of continuous-fiber composites by in-nozzle impregnation" *Sci. Rep.* 6:23058 (2016) pp. 1-7.
Miaris, et al. "Continuous impregnation of carbon-fibre rovings"*JEC Comp.* 56 (2010) pp. 75-76.
Molitch-Hou, M. "A new spin on 3D printing weaves objects without supports" engineering.com (2016) pp. 1-3.
Mori, et al. "Dieless forming of carbon fibre reinforced plastic parts using 3D printer" *Procedia Eng.* 81 (2014) pp. 1595-1600.
Moroni, et al. "Functionality-based part orientation for additive manufacturing" *Procedia CIRP* 36 (2015) pp. 217-222.
Nelaturi, et al. "Representation and analysis of additively manufactured parts" *Comp.-Aided Des.* 67 (2015) pp. 13-23.

(56) References Cited

OTHER PUBLICATIONS

Olhoff, et al. "On CAD-integrated structural topology and design optimization" *Comp. Meth. Appl. Mech.* Eng 89 (1991) pp. 259-279.
Padhye, et al. "Multi-objective optimisation and multi-criteria decision making in SLS using evolutionary approaches" *Rapid Prototyp. J.* 17(6) (2011) pp. 458-478.
Pandey, et al. "Real time adaptive slicing for fused deposition modeling" *Mach. Tools Manuf.* 43 (2003) pp. 61-71.
Park, et al. "Tool path generation for a surface model with defects" *Comp. Indust.* 61(1) (2010) pp. 75-82.
Park, et al. "Tool-path generation from measured data" *Comp.-Aided Des.* 35(5) (2003) pp. 467-475.
Pham, et al. "Part orientation in steteolithography" *Int'l J. Adv. Manuf. Techn.* 15(9) (1999) pp. 674-682.
Pham, et al. "A comparison of rapid prototyping technologies" *Int'l J. Mach. Tools Manuf.* 38 (1998) pp. 1257-1287.
Ponche, et al. "Ch. 11—A new global approach to design for additive manufacturing" *Additive Manuf. Handbook* (2012) pp. 170-186.
Popescu, et al. "Direct tool-path generation based on graph theory for milling roughing" *Procedia CIRP* 25 (2014) pp. 75-80.
Ramachandran, et al. "Mayavi: 3D Visualization of Scientific Data" *IEEE Comp. Sci. Eng.* 13(2) (2011) pp. 40-51.
Ren, et al. "Clean-up tool path generation by contraction tool method for machining complex polyhedral models" *Comp. Ind.* 54(1) (2004) pp. 17-33.
Rieder, et al. "Online monitoring of additive manufacturing processes using ultrasound" *Euro. Conf. Non-Destr. Test.* (2014) pp. 1-8. (Abstract only).
Rosen, D.W. "Computer-aided design for additive manufacturing of cellular structures" *Comp-Aided Des. Appl.* 4(5) (2013) pp. 585-594.
Russell, et al. "American makes: The National Additive Manufacturing Innovation Institute (NAMII) Status Report and Future Opportunities" *SAMPE J.* 50 (2014) pp. 62-65.
Sellamani, et al. "PCS: Prominent cross-sections for mesh models" *Comp.-Aided Des. Appl.* 7(4) (2010) pp. 1-20.
Singamneni, et al. "Modeling and evaluation of curved layer fused deposition" *J. Mater. Proc. Tech.* 212 (2012) pp. 27-35.
Singamneni, et al. "Curved-layer fused deposition modelling" *J. New Gener. Sci.* 8(2) (2010) pp. 95-107.
Smith, et al. "Structural characteristics of fused deposition modeling polycarbonate material" *Polym. Test.* 32(8) (2013) pp. 1306-1312.
Stentz, A. "Optimal and efficient path planning for partially-known environments" *Proc. IEEE Int'l Conf. Robot. Autom.* (1994) pp. 3310-3317.
Stevenson, K. "Can ENOMOTO's Experimental 5-Axis 3D Printer Hybrid Do the Impossible?" *Fabbaloo* (2016) pp. 1-2.
Subrahmanyam, et al. "An overview of automatic feature recognition techniques for computer-aided process planning" *Comp. Indust.* 26(1) (1995) pp. 1-21.
Sugavaneswaran, et al. "Analytical and experimental investigation on elastic modulus of reinforced additive manufactured structures" *Mater. Des.* 66 (2015) pp. 29-36.
Talagani et al. "Numerical simulation of big, area additive manufacturing (3D printing) of a full size car" *SAMPE J.* 51(4) (2015) pp. 27-34.
Tang, et al. "Integration of topology and shape optimization for design of structural components" *Struct. Multidiscipl. Optim.* 22 (2001) pp. 65-82.
Tang, et al. "A review of methods for improving the interfacial adhesion between carbon fiber and polymer matrix" *Polym. Comp.* 18(1) (1997) pp. 100-113.

Taylor, et al. "Inkjet printing of carbon supported platinum 3-D catalyst layers for use in fuel cells" *J. Power Sources* 171(1) (2007) pp. 101-106.
Tuttle, et al. "Feature recognition for NC part programming" *Comp. Indust.* 35(3) (1998) pp. 275-289.
Ullman, D.G. "The Mechanical Design Process" *McGraw-Hill* (2010) pp. 1-450.
Vega, et al. "The effect of layer orientation on the mechanical properties and microstructure, of a polymer" *J. Mater. Eng. Perf.* 20 (2011) pp. 978-988.
Wang, et al. "A model research for prototype warp deformation in the FDM process" *Int'l J. Adv. Manuf. Tech.* 33 (2007) pp. 1087-1096.
Weiss, et al. "Low-cost closed-loop control of a 3D printer gantry" *Rapid Prototyp. J.* 21(5) (2015) pp. 482-490.
West, et al. "A process planning method for improving build performance in stereolithography" *Comp.-Aided Des.* 33(1) (2001) pp. 65-79.
Wheeler, A. "GE Aviation's First 3D Printed Engine Component for the GE 90 Engine" engineering.com (2015) pp. 1-2.
Wohlers, et al. "Wohlers Report 2016: History of additive manufacturing" *Wohlers Associates, Inc.* (2016) pp. 1-38.
Wong, et al. "A review of additive manufacturing" *ISRN Mech. Eng.* 2012:208760 (2012) pp. 1-10.
Wu, et al. "Implementation of CL points preprocessing methodology with NURBS curve fitting technique for high-speed machining" *Comp. Indust. Eng.* 81 (2015) pp. 58-64.
Xu, et al. "Considerations and selection of optimal orientation for different rapid prototyping systems" *Rapid Prototyp. J.* 5(2) (1999) pp. 54-60. (Abstract only).
Xue, et al. "Mechanistic Fatigue Modeling for Continuous Fiber-Reinforced Polymer Matrix Composites" *Int'l SAMPE Tech. Conf.* (2013) pp. 801-812. (Abstract only).
Yan, et al. "A review of rapid prototyping technologies and systems" *Comp.-Aided Des.* 28 (1996) pp. 307-318.
Zdyrko, et al. "Polymer Brushes by the 'Grafting to' Method" *Macromolecular Rapid Commun.* 32(12) (2011) pp. 859-869.
Zhang, et al. "A Facet Cluster-based Method for Build Orientation Generation in Additive Manufacturing" *Proc. Ann. Int'l Sol. Freeform Fabr. Symp.* (2016) pp. 23-35.
Zhang, et al. "Build Orientation Determination for Multi-material Deposition Additive Manufacturing with Continuous Fibers" *Procedia CIRP* 50 (2016) pp. 414-419.
Zhang, et al. "Feature based building orientation optimization for additive manufacturing" *Rapid Prototyp. J.* 22(2) (2016) pp. 358-376. (Abstract only).
Zhang, et al. "Build orientation optimization for multi-part production in additive manufacturing" *J. Intell. Manufact.* (2015) pp. 1-15.
Zhang, et al. "Evaluating the design for additive manufacturing—a process planning perspective" *Procedia CIRP* 21 (2014) pp. 144-150.
Zhang, et al. "An integrated decision-making model for multi-attributes decision-making (MADM) problems in additive manufacturing process planning" *Rapid Prototyp. J.* 20(5) (2014) pp. 377-389. (Abstract only).
Zhang, et al. "Using AM feature and multi-attribute decision making to orientate part in additive manufacturing" *High Val. Manuf.: Adv. Res. Virt. Rap. Prototyp.* (2013) pp. 411-416.
Zhong, et al. "Short fiber reinforced composites fused deposition modeling" *Mater. Sci. Eng.* A301 (2001) pp. 125-130.
Zhuang, et al. "Topology optimization of multi-material for the heat conduction problem based on the level set method" *Eng. Optim.* 42 (2010) pp. 811-831.
Zuo, et al. "A simple and compact python code for complex 3D topology optimization" *Adv. Eng. Softw.* 85 (2015) pp. 1-11.

\* cited by examiner

INTEGRATED ROBOTIC 3D PRINTING SYSTEM FOR PRINTING OF FIBER REINFORCED PARTS

PRIORITY INFORMATION

The present application claims priority to U.S. Provisional Patent Application Ser. No. 62/209,573 titled "Integrated Robotic 3D Printing System for the Printing of Fiber Reinforced Parts" of van Tooren, et al. filed on Aug. 25, 2015, the disclosure of which is incorporated by reference herein.

BACKGROUND OF THE INVENTION

Additive manufacturing refers to any method for forming a three-dimensional ("3D") object in which successive layers of material are laid down according to a controlled deposition and solidification process. The main differences between additive manufacturing processes are the types of materials to be deposited and the way the materials are deposited and solidified. Fused deposition modeling (also commonly referred to as 3D printing) extrudes materials including liquids (e.g., polymeric melts or gels) and extrudable solids (e.g., clays or ceramics) to produce a layer, followed by spontaneous or controlled curing of the extrudate in the desired pattern of the structure layer. Other additive manufacturing processes deposit solids in the form of powders or thin films, followed by the application of energy and/or binders often in a focused pattern to join the deposited solids and form a single, solid structure having the desired shape. Generally, each layer is individually treated to solidify the deposited material prior to deposition of the succeeding layer, with each successive layer becoming adhered to the previous layer during the solidification process.

Unfortunately, while additive manufacturing technologies have become much more common and less expensive in recent years, the technology is primarily limited to formation of prototypes, as the formed materials generally exhibit low strength characteristics. Attempts have been made to form higher strength composite structures, for instance by combining a high crystalline polymer with a lower crystalline polymer in a fused deposition process. While such attempts have provided some improvement in the art, room for further improvement exists. For instance, the characteristics of highly crystalline polymers are still less than what is desirable in many high strength applications.

What are needed in the art are methods for formation of high strength composites according to an additive manufacturing process and the composites formed thereby.

BRIEF DESCRIPTION OF THE INVENTION

Aspects and advantages of the invention will be set forth in part in the following description, or may be obvious from the description, or may be learned through practice of the invention.

A system is generally disclosed for printing a three-dimensional object. In one embodiment, the system includes at least one print head configured to receive a continuous fiber and at least partially encase the continuous fiber with a formation material to create a composite material. The system also includes at least one print bed comprising a printing surface onto which the composite material may be selectively applied to form a work piece.

The system may include, in particular embodiments, at least one print bed comprising a printing surface onto which print media is applied to form a work piece, with the at least one print bed being configured to move in at least six different degrees of freedom. The at least one print head can be positioned relative to the at least one print bed and configured to advance print media thereon.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1A:
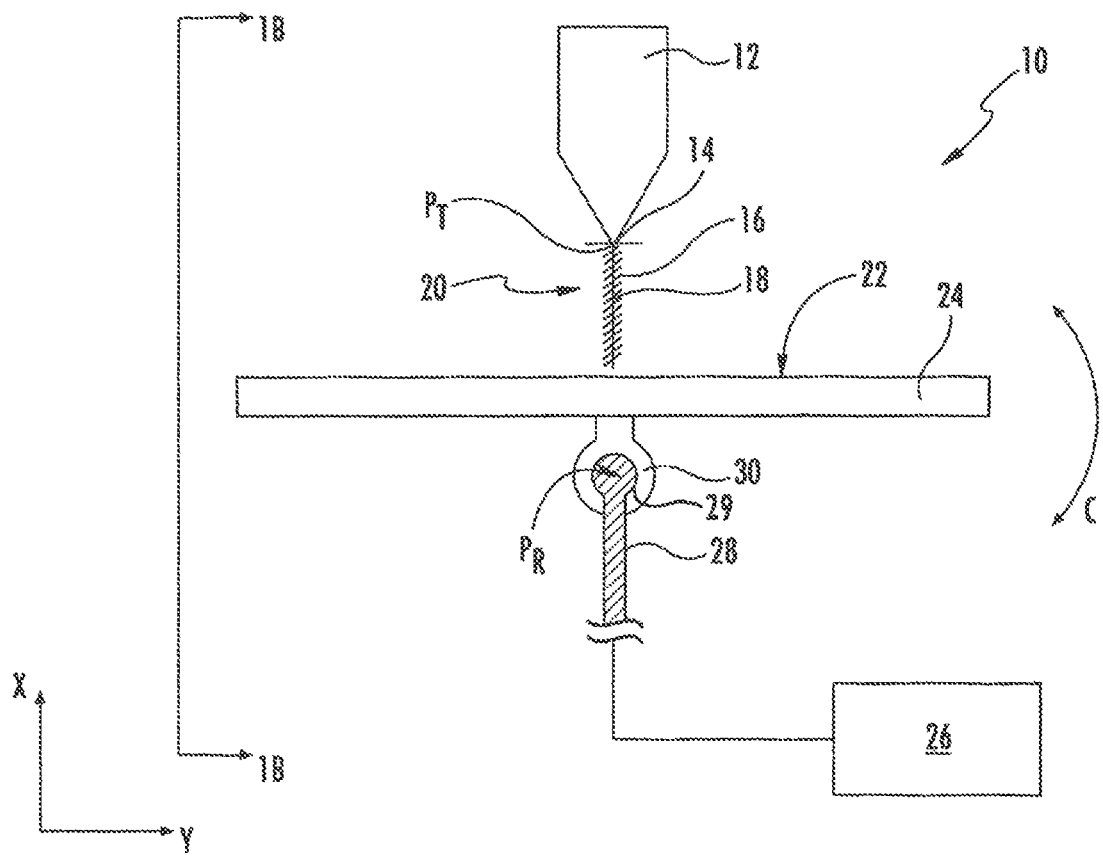
FIG. 1A shows a front view of an exemplary system having a print bed with 7 degrees of movement, independently controllable.

Repeat use of reference characters in the present specification and drawings is intended to represent the same or analogous features or elements of the present invention.

DETAILED DESCRIPTION OF THE INVENTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A 3D printer is generally provided, along with methods of its construction and use. Generally, the 3D printer allows for printing of composite parts with continuous fibers in multiple directions and orientations, which can lead to the production of composite parts. Thus, the provided 3D printer combines the advantages of traditional 3D printing using plastics with the strength and stiffness of composite parts produced with methods such as vacuum injection. The 3D printer is particularly suitable for printing ready-for-use duct work, conduit, tubing, piping, channeling, hollow-chambered structures and other similar structures by addressing the stiffness and strength shortcomings that would be associated with forming these parts with a conventional 3D printing technique, which would provide unreinforced polymer 3D printed parts. As an example, the provided 3D printer can be used in applications to print thin-walled, complex shaped parts, which, heretofore could only be manufactured in a complex, multi-step process. Thus, the provided 3D printer and processes allows the 3D printing of multi-axial composite parts with multiple degrees of print freedom, opening the possibility of printing high performance parts with the continuous fiber reinforcement creating the required stiffness and strength.

The 3D printer, according to one embodiment, utilizes a six (6) Degrees of Freedom (or more, including seven degrees of freedom) system that allows the printing of fiber(s) in different directions and orientations relative to a plane perpendicular of a print bed, where in some instances, the fiber is a continuous fiber. By the term "6 Degrees of Freedom" refers to the freedom of movement in three-dimensional space of the print bed onto which the fibers are printed. Specifically, the print bed has six (6) independently controllably movements: three translational movements and three rotational movements. The translational movements are up/down, left/right, and forward/backward, and the three rotational movements are typically referred to as pitch, roll, and yaw. The print head may be fixed relative to some degrees of freedom, such as up/down, or alternatively also exhibit six degrees of freedom. In some embodiments, added degrees of freedom can be achieved by the introduction of a mandrel on the print bed to which composite material is applied. Orientation of the mandrel, itself, may be controlled relative to the print bed to provide added degrees of freedom (i.e., 7 degrees of freedom).

The various degrees of freedom of the print bed, and in some instances, the movement of an added mandrel, allow for complex introduction of fiber(s) and/or composite materials into and/or within a work piece (e.g., object, part component, and the like) above and beyond what is achievable by a standard 3D printer. Instead of introduction of a fiber and/or composite material in a stepped-fashion to a work piece, the orientation, elevation, angle, and the like of a fiber(s) and/or composite material may be varied during the printing process to create complex printed formations/shapes within the work piece. For example, the fiber(s) and/or composite material could be applied as the print bed is periodically or continuously altered in direction/orientation to create a complex pattern of fiber(s) and/or composite material, such as for example, a zigzag pattern in the work piece or bend or complex shape in the work piece that cannot be achieved by linear application of material as performed by traditional 3D printers. The continuous fiber(s) or composite material may even be twisted about itself by manipulation of the print bed and/or an alternative mandrel relative to the fiber(s) or composite material during application.

Figure 1B:
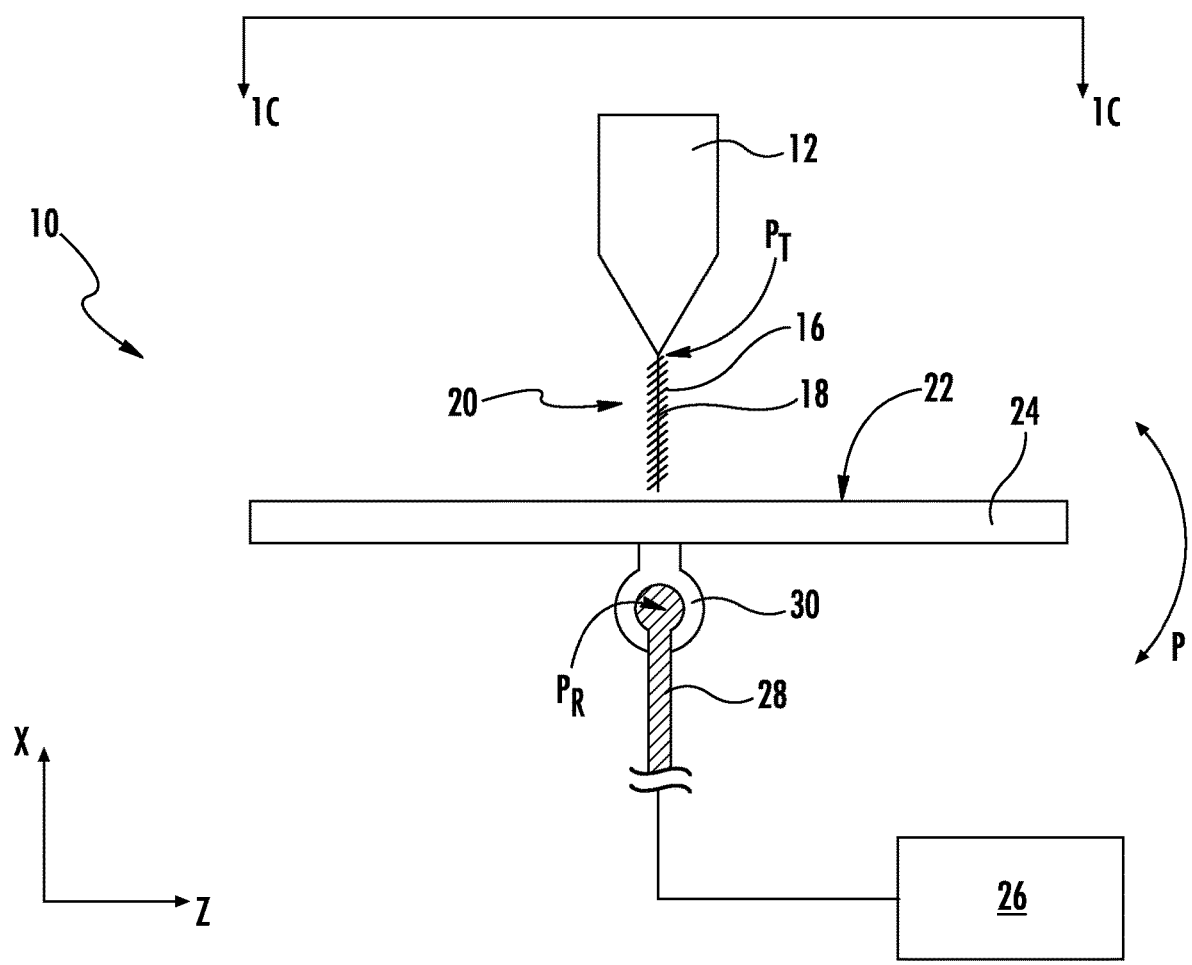
FIG. 1B shows a side view of the exemplary system of FIG. 1A.
Figure 1C:
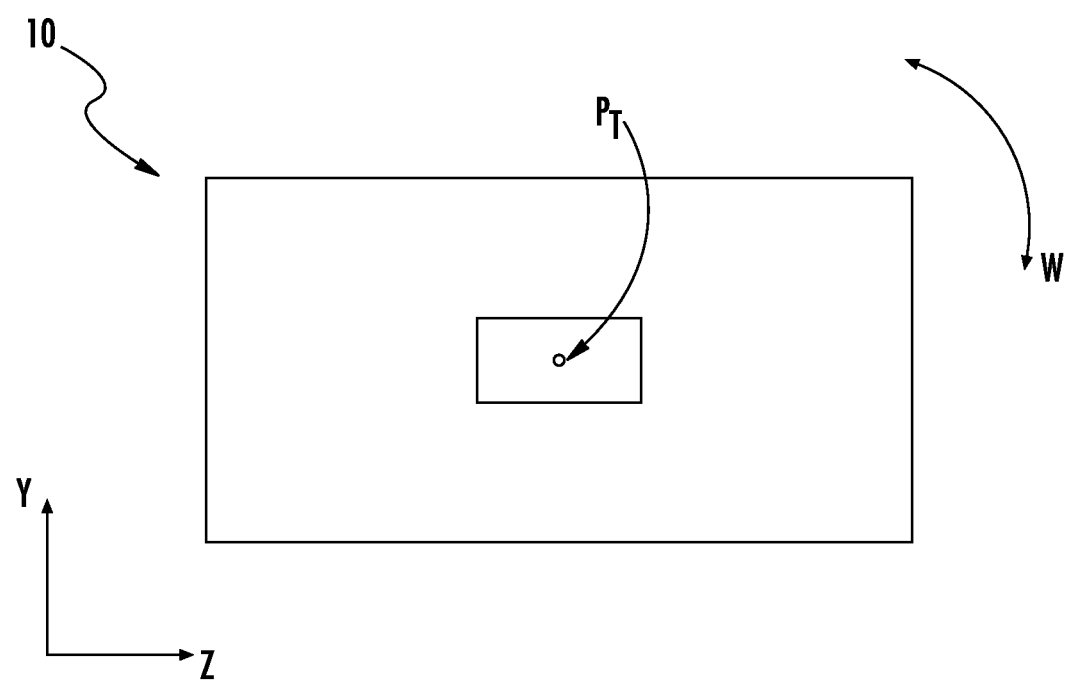
FIG. 1C shows a top view of the exemplary system of FIG. 1A.

FIGS. 1A-1C shows an exemplary system 10 including a nozzle 12 having an extrusion tip 14 defining a translational point PT. The nozzle 12 combines a formation material 16 and a continuous fiber 18 to form a composite material 20. During printing, the composite material 20 is deposited onto the printing surface 22 of the print bed 24 and/or a mandrel (not shown) located on the printing surface, where the mandrel acts as a structural form to which the composite material is applied, and/or an existing work piece. The print bed 24 is moveable, independently with 6 degrees of freedom, as controlled by the controller 26. As will be discussed later, the movement/orientation of an optional mandrel may also be controlled relative to the print bed to provide added degrees of freedom for further complex printing.

The print bed 24 is moveable in the x-direction (i.e., up/down with respect to the translational point PT), in the y-direction (i.e., laterally with respect to the translational point PT), and z-direction (i.e., cross-laterally with respect to the translational point PT). The print bed 24 can be moved translational, independently, by controller 26 using the arm 28 connected to the receiver 30 of the print bed 24. In particular embodiments, the arm 28 can be formed from multiple segments connected together at moveable joints (bending and/or rotating) to allow for translational movement of the print bed 24 with respect to the translation point PT.

Additionally, the print bed 24 is rotationally movable about the rotational point PR to allow roll (r), pitch (p), and yaw (w) rotational movement. The print bed 24 can be rotated in any direction, independently, by controller 26 using the arm 28 connected to the receiver 30 of the print bed 24. Although shown as utilizing a rotation ball 29 coupled to the receiver 30, any suitable connection can be utilized.

Figure 1D:
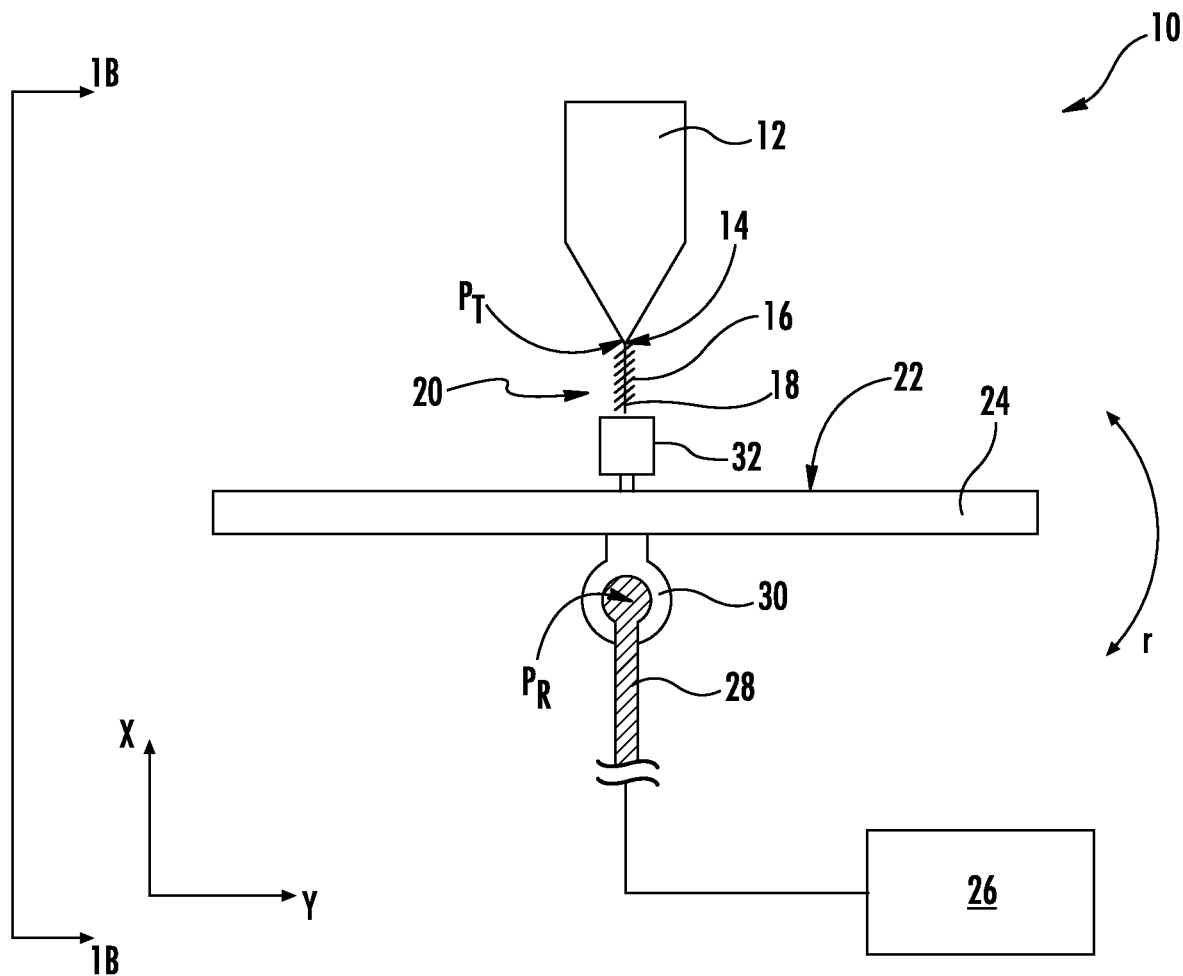
FIG. 1D shows a side view of a prototype set-up employing a mandrel connected with the print bed.

As shown in FIG. 1D, a mandrel 32 may be applied to the printing surface 22 of the print bed 24. The mandrel 32 may act as a structural form to which the fiber(s) and/or composite materials are applied to form the work piece. In some embodiments, the mandrel may be applied in a stationary manner to the printing surface and move with the print bed 24 of the printer. In some embodiments, the mandrel may be applied to a second printing surface or positioned on a moveable arm that is separate from the print bed 24, so that the mandrel is moveable relative to the print bed 24 to create further degrees of freedom beyond the six degrees of freedom achieved via the movable print bed. Alternatively, added degrees of freedom could be achieved via use of multiple print beds that are each movable in six degrees of freedom relative to the base print bed 24, whereby controlled orientation of the base print bed 24 and controlled orientation of the added print beds creates further degrees of freedom.

In one embodiment, the controller 26 may comprise a computer or other suitable processing unit. Thus, in several embodiments, the controller 26 may include suitable computer-readable instructions that, when implemented, configure the controller 26 to perform various different functions, such as receiving, transmitting and/or executing arm movement control signals.

A computer generally includes a processor(s) and a memory. The processor(s) can be any known processing device. Memory can include any suitable computer-readable medium or media, including, but not limited to, RAM, ROM, hard drives, flash drives, or other memory devices. The memory can be non-transitory. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. Memory can also include data that may be retrieved, manipulated, or stored by processor(s).

The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with the arm 28, the rotation ball 29, and/or the nozzle 12.

In one embodiment, the printer can include multiple nozzles. For example, a nozzle can be included to print wax-like material to support the formation material during the printing process.

In one particular embodiment, the controller 26 can include (or be in communication with a computer that includes) supporting software programs that can include, for example, computer aided design (CAD) software and additive manufacturing layering software as are known in the art. The controller 26 can operate via the software to create a three-dimensional drawing of a desired structure and/or to convert the drawing into multiple elevation layer data. For instance, the design of a three-dimensional structure can be provided to the computer utilizing commercially available CAD software. The structure design can then be sectioned into multiple layers by commercially available layering software. Each layer can have a unique shape and dimension. The layers, following formation, can reproduce the complete shape of the desired structure.

For example, the printer can be accompanied with software to slice beyond the current xyz slicing methodology used in industry. For example, 3D objects other than 3D Cartesian objects, such as a iso-parametric helically/spirally winded band around a duct, can be spirally sliced instead of sliced in a flat plane, to be able to spirally lay-down/print filament and/or slit tape/tow. Thus, the iso-parametrical slicing can be utilized with printing capability of the 6 degrees of freedom.

In a traditional 3D printing system, the layer files are translated to print head movements for applying material to a print bed to form the work piece. In the print system provided herein, the layer files are also translated to print bed and/or mandrel movements to create the various layers and continuous thread patterns discussed herein via movement of the print head and/or the mandrel.

Numerous software programs have become available that are capable of performing the presently specified functions. For example, AUTOLISP can be used to convert AUTOCAD drawings into multiple layers of specific patterns and dimensions. CGI (Capture Geometry Inside, currently located at 15161 Technology Drive, Minneapolis, Minn.) also can provide capabilities of digitizing complete geometry of a three-dimensional object and creating multiple-layer data files. The controller 26 can be electronically linked to mechanical drive means so as to actuate the mechanical drive means in response to "x," "y," and "z" axis drive signals and "p," "r," and "w," rotation signals, respectively, for each layer as received from the controller 26.

As stated, the composite material 20 includes a formation material 16 and a continuous fiber 18. The continuous fiber 18 is discharged in conjunction with the formation material 20 such that the continuous fiber 18 is at least partially encased within the formation material 20 to form the composite material 20, as shown. The formation material 16 can be a metal, a polymeric material, etc. that is fed to the nozzle 12 and is heated above the melting temperature of the material to soften and/or liquefy so as to flow through the extrusion tip 14 and form a partial or continuous coating on the continuous fiber 18, such that the formation material bonds with the outer surface of the continuous fiber.

The formation material 16 can be, for example, a gel, a high viscosity liquid, or a formable solid that can be extruded in the desired pattern. Formation materials likewise can be organic or inorganic. Formation materials can include, without limitation, polymers including thermoplastic polymers or thermoset polymers (e.g., polyolefins, polystyrenes, polyvinyl chloride, elastomeric thermoplastics, polycarbonates, polyamides, etc.), eutectic metal alloy melts, clays, ceramics, silicone rubbers, and so forth. Blends of materials can also be utilized as the formation materials, e.g., polymer blends. The formation materials can include additives as are generally known in the art such as, without limitation, dyes or colorants, flow modifiers, stabilizers, nucleators, flame retardants, and so forth.

The formation material is combined with a high strength continuous fiber(s) 18 prior to or during formation of the layer. The high strength continuous fibers can be utilized as individual fibers or as bundles of fibers, e.g., a roving. As used herein, the term "roving" generally refers to a bundle or tow of individual fibers. The fibers contained within the roving can be twisted or can be straight. Although different fibers can be used in a roving, it can be beneficial in some embodiments, if a roving contains a single fiber type to minimize any adverse impact of using fiber types having a different thermal coefficient of expansion. The number of fibers contained in each roving can be constant or vary from roving to roving and can depend upon the fiber type. A roving can include, for instance, from about 500 fibers to about 100,000 individual fibers, or from about 1,000 fibers to about 75,000 fibers, and in some embodiments, from about 5,000 to about 50,000 fibers.

The continuous fibers possess a high degree of tensile strength relative to their mass. For example, the ultimate tensile strength of the fibers can be about 3,000 MPa or greater. For instance, the ultimate tensile strength of the fibers as determined according to ASTM D639 (equivalent to ISO testing method 527) is typically from about 3,000 MPa to about 15,000 MPa, in some embodiments from about 4,000 MPa to about 10,000 MPa, and in some embodiments, from about 5,000 MPa to about 6,000 MPa. Such tensile strengths may be achieved even though the fibers are of a relatively light weight, such as a mass per unit length of from about 0.1 to about 2 grams per meter, in some embodiments from about 0.4 to about 1.5 grams per meter. The ratio of tensile strength to mass per unit length may thus be about 2,000 Megapascals per gram per meter ("MPa/g/m") or greater, in some embodiments about 4,000 MPa/g/m or greater, and in some embodiments, from about 5,500 to about 30,000 MPa/g/m.

The high strength fibers may be organic fibers or inorganic fibers. For example, the high strength fibers may be metal fibers (e.g., copper, steel, aluminum, stainless steel, etc.), basalt fibers, glass fibers (e.g., E-glass, A-glass, C-glass, D-glass, AR-glass, R-glass, S1-glass, S2-glass, etc.), carbon fibers (e.g., amorphous carbon, graphitic carbon, or metal-coated carbon, etc.), nanotubes, boron fibers, ceramic fibers (e.g., boron, alumina, silicon carbide, silicon nitride, zirconia, etc.), aramid fibers (e.g., Kevlar® marketed by E. I. duPont de Nemours, Wilmington, Del.), synthetic organic fibers (e.g., polyamide, ultra-high molecular weight polyethylene, paraphenylene, terephthalamide, and polyphenylene sulfide), polybenzimidazole (PBI) fibers, and various other natural or synthetic inorganic or organic fibrous materials known for reinforcing compositions. The materials used to form the fibers can include various additives as are known in the art, e.g., colorants, etc.

Carbon fibers are particularly suitable for use as the continuous fibers, which typically have a tensile strength to mass ratio in the range of from about 5,000 to about 7,000 MPa/g/m.

The continuous fibers can generally have a nominal diameter of about 2 micrometers or greater, for instance about 4 to about 35 micrometers, and in some embodiments, from about 5 to about 35 micrometers.

The continuous fibers are discharged in conjunction with the formation material during the formation of an individual layer of the additively manufactured product structure such that the continuous fiber is at least partially encased by the formation material. Any suitable method for combining the materials can be utilized, provided that the continuous fiber is adequately incorporated with the formation material and bonding between the two materials can occur. The type of bond formed between the continuous fiber and the formation material can depend upon the two materials involved. For instance a thermal bond, a chemical bond, a friction bond, an electrostatic bond, etc. can be formed between the two materials in order that the high strength continuous fiber is at least partially encased by the formation material and the two components will be effectively bonded to one another. In some embodiments, both the continuous fiber and the formation material may be sufficiently heated to promote admixing of the formation material and continuous fiber to form the composite material.

As will be appreciated from this disclosure, the continuous fiber may be any material having reinforcing characteristics. The continuous fiber may be formed of a plurality of fibers of either the same or differing materials. The formation material may be formed of one material or an admixture of multiple materials. Further, the print head may be configured to apply one or multiple coatings of formation material on the continuous fiber, either stacked on the other, overlapping or applied at different positions on the surface of the continuous fiber. Further, the print head could be configured to advance several different continuous fibers with different or the same formation materials, depending on the specifications required for formation of a work piece. In addition, the system could include multiple print heads configured to provide either the same or different print media to a work piece, so that different compositions of materials may be used to form the work piece. For example, some print heads could be configured to either advance different continuous fibers and/or formation materials to provide different composition materials to be selectively applied to the work piece. In further or alternative embodiments, some print heads may be configured to provide continuous fiber reinforced composite materials, while other print heads provide non-reinforced printing media to thereby provide a work piece that has selective reinforced sections.

Discharge of the continuous fiber from the print head can be achieved in different manners, depending on the application. In one embodiment, the continuous fiber may be advanced through the print head as part of an extrusion process, whereby the continuous fiber is "pushed" or urged through the print head. In this embodiment, the continuous fiber is engaged with a driving system, such as a motorized friction drive wheel(s) or a forced air system, to advance the continuous fiber through the print head. The continuous fiber enters an input orifice in the print head and is advanced toward the extrusion tip 14 of the nozzle 12. The formation material 16 is heated above the melting temperature of the formation material to soften and/or liquefy so as to flow through the extrusion tip 14 and form at least a partial coating on the continuous fiber 18, as the continuous fiber is advanced from the print head and onto the printing surface 22, a mandrel 32, and/or an existing work piece on the print bed 24. By movement of the print bed 24 and/or the mandrel relative to the print head, work pieces can be formed by additive application of the composite material 20 onto the printing surface 22, mandrel, and/or existing work piece.

As an alternative to advancing the continuous fiber by push or urging the fiber through the print head, the continuous fiber may be advanced by a pultrusion operation, whereby the continuous fiber is drawn or pulled from the tip of the nozzle. In this embodiment, the contact point of the composite material on the printing surface 22 of the print bed 24, an alternative mandrel 32 located on the print bed 24, and/or an existing work piece located on the print bed creates an anchor (e.g., a fixed, contact, gripping point, and the like) that allows for the composite material 20 to be pulled from the print head as the print bed 24, mandrel 32, and/or existing work piece is moved relative to the print head to form the finished work piece. In this embodiment, using the movement of the print bed and/or mandrel allows for precise control of the advancement of the composite material 20 from the print head.

Drawing or "casting on" of the composite material 20 onto the printing surface 22, mandrel 32 and/or existing work piece to begin the printing process can be accomplished by various methods. For example, the composite material 20 could be connected or adhered to a needle or other type structure that can draw the composite material from the print head and apply it to the printing surface, mandrel, and/or existing work piece. As an alternative, the nozzle of the print head may be brought into contact with the printing surface 22 of the print bed 24, the mandrel 32, and/or the existing work piece so as to contact the composite material 20, whereby either the composite material itself or the formation material 16 surrounding the continuous fiber 18 in the melted state adheres to the printing surface 22, mandrel 32, and/or the existing work piece creating an anchor for pulling the composite material 20 from the print head.

The rate of advancement of the continuous fiber through the print head, the temperature of the formation material, and/or in some instances, the temperature of the printing surface 22 of the print bed 24, the mandrel 32, and/or the existing work piece on the print bed require some level of control to ensure that the continuous fiber 18 receives a consistent/desired coating and that the composite material 20 is applied to either the printing surface 22, mandrel 32, and/or existing work piece in a manner to adhere to same. For example, the temperature of the formation material 16 and the rate of movement of the print bed and/or mandrel may be controlled to ensure that the composite material 20 is applied in a manner to allow for proper adherence of the composite material 20 to the printing surface 22, mandrel 32, and/or existing work piece. In some instances, the printing surface and/or the mandrel and/or the existing work piece on which the composite material 20 is applied can also or alternatively be temperature controlled for this purpose. In general, the rate of application and temperature of the formation material 16 on the continuous fiber 18 are controlled to ensure that the coating is applied in a desired manner on the continuous fiber and that the composite material 20 is drawn from the print head is a consistent manner.

Tensioning of the composite material may also be required for proper advancement onto the printing surface, mandrel, and/or existing work piece. Tensioning systems can take many forms and be located at different positions in the process to provide proper tensioning of the continuous fiber and/or the composite material. For example, a spool maintaining the continuous fiber could be fitted on a tensioning system, such as a rotational break or clutch that impedes rotation of the spool as continuous fiber is meted from the spool to provide tensioning. Similarly, the print head may include a tensioning system, such as restrictive pulleys, clutch, friction element or the like to apply tension to the continuous fiber.

It is also contemplated that the proposed printer could be equipped to perform both "push" and pultrusion of the continuous fiber to advance the continuous fiber through the print head. In this embodiment, there may be drive means associated with the print head to advance the continuous fiber through the print head assisted by a pulling effect of the movement of the print bed, mandrel, and/or existing work piece on the composite material as it is advanced.

As mentioned above, the composite material 20 may be applied to a mandrel, where the mandrel operates as a form, support and/or pattern of the work piece to be manufactured from the composite material 20. The mandrel aids in shaping of the work piece being printed as the composite material is applied to the mandrel. After printing is complete, and the printed work piece has at least partially cured, the mandrel can be removed from the work piece, such as by eroding, dissolving, breakings, shrinking, or other contemplated procedures for removing either portions of or the entire mandrel.

The above description discloses an embodiment of the system that incorporates both a print head capable of advancing a continuous fiber and a print bed that is moveable with six degrees of freedom. It is understood, however, that embodiments are contemplated whereby a print head capable of advancing a continuous fiber may be incorporated into a system that comprises a stationary print bed. Alternatively, embodiments are contemplated whereby a system is employed that includes a print bed that is moveable with six degrees of freedom in combination with a traditional 3D print head that does not advance a continuous fiber.

EXAMPLES

A prototype set-up was developed that includes a 6 degrees of freedom robot with integrated industrial level controls to operate the extruder (print head), hotbed and temperature sensors. Integration of hardware and software has been achieved. Fiber reinforced material system has been defined and experiment preparations are in progress to do solvent based filament production.

A KUKA KR6 based robotic system was developed to print thin walled continuous carbon reinforced ULTEM ducting for use in vehicles. The system allows printing of carbon fiber reinforced ULTEM of thin walled ducts with fibers printed not only in the plane of the cross-section of the duct but also in directions with angles with respect to the cross-sectional plane. This is in contrast to current 3D printing systems based on printing layer by layer and therefore allowing only fibers in the cross-sectional plane. The system may offer seven (7) degrees of freedom (3 translations and 3 rotations related to the robot and 1 degree of freedom imparted by a separate mandrel). The system is fed with a material system compliant to the Fire, Smoke and Toxicity (FST) requirements specified by FAA and EASA. The system has multiple printing heads to be able to print parts that are designed to be built from a combination of unreinforced, chopped fiber reinforced and continuous fiber reinforced materials. In addition a printing head is supplied able to print support material that can be removed after printing. This support material serves as an optional stabilizer for long, thin walled parts.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in-whole or in part. Furthermore, those of ordinary skill in the art will appreciate that the foregoing description is by way of example only, and is not intended to limit the invention so further described in the appended claims.

What is claimed is:

1. A system for printing a three-dimensional object, the system comprising:
   a print head configured to receive a continuous fiber and at least partially encase the continuous fiber with a formation material to create a composite material;
   a print bed comprising a printing surface onto which the composite material may be selectively applied;
   an arm comprising one or more movable joints in communication with the print bed, and
   a mandrel positioned on a movable arm, an end of the movable arm being located on the print bed, the mandrel being located for receiving the composite material from the print head and providing a form for shaping of the composite material into a selected shape;
   wherein said print bed is configured to move in at least three translational degrees of freedom and at least three rotational degrees of freedom using the one or more movable joints, and wherein said mandrel is moveable relative to the print bed using the movable arm.

2. The system according to claim 1, further comprising:
   a drive means associated with said print head for advancing the continuous fiber through the print head.

3. The system according to claim 1, wherein the continuous fiber is advanced through the print head by pulling of the composite material via a connection of the composite material with the surface of the print bed, the mandrel, and/or an existing work piece.

4. The system of claim 1, wherein the print head exhibits motion in six degrees of freedom.

5. A system for printing a three-dimensional object, the system comprising:
   a print bed comprising a surface;
   a movable joint;
   a rotation ball, wherein the print bed is configured to move in at least three rotational degrees of freedom and at least three translational degrees of freedom using the rotation ball, the movable joint, or a combination thereof;
   a print head positioned relative to said print bed and configured to advance print media thereon; and
   a mandrel positioned on a movable arm, an end of the movable arm being located on the print bed, the mandrel being located for receiving print media from the print head and providing a form for shaping of the print media into a selected shape, wherein said mandrel is moveable relative to the print bed using the movable arm.

6. The system according to claim 5, further comprising:
   a controller in communication with the rotation ball, the movable joint, the movable arm or a combination thereof.

7. The system according to claim 5, wherein the print head is configured to receive a continuous fiber and at least partially encase the continuous fiber with a formation material to create the print media.

8. The system according to claim 7, further comprising:
a drive means associated with the one print head for advancing the continuous fiber through the print head.

9. The system according to claim 7, wherein the continuous fiber is advanced through the print head and onto the surface, the mandrel, and/or an existing work piece by pulling of the print media via a connection of the print media with the surface, the mandrel, and/or the existing work piece.

10. The system of claim 5, wherein the print head exhibits motion in six degrees of freedom.

\* \* \* \* \*